(12) United States Patent
Shirakawabe et al.

(10) Patent No.: US 6,405,583 B1
(45) Date of Patent: Jun. 18, 2002

(54) CORRELATION SAMPLE FOR SCANNING PROBE MICROSCOPE AND METHOD OF PROCESSING THE CORRELATION SAMPLE

(75) Inventors: Yoshiharu Shirakawabe; Hiroshi Takahashi; Nobuhiro Shimizu; Takehiro Yamaoka, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/296,081

(22) Filed: Apr. 21, 1999

(51) Int. Cl.$^7$ .............................. G01B 5/28; G01B 7/34; G01N 1/28; G01N 1/32
(52) U.S. Cl. ........................................ 73/105; 73/1.86
(58) Field of Search ................... 73/105, 1.86

(56) References Cited

U.S. PATENT DOCUMENTS 5,520,769 A    5/1996  Barrett et al. ................ 438/14
5,691,467 A  * 11/1997  Goldmann et al. ........... 73/105

FOREIGN PATENT DOCUMENTS

| EP | 628809 A1 | 12/1994 |
| EP | 676614 A1 | 10/1995 |
| GB | 1455557   | 11/1976 |

OTHER PUBLICATIONS

*Applied Physics Letters*, vol. 57, No. 24, pp. 2612–2614, T. Goddenhenrich et al., "Probe Calibration in Magnetic Force Microscopy".
*IEEE MTT–S International Microwave Symposium Digest*, vol. 2, pp. 1005–1008, U. Mueller et al., "Geometrical and Voltage Resolution of Electrical Sampling Scanning Force Microscopy".
Patent Abstracts of Japan, vol. 018, No. 585 (M–1700), Nov. 9, 1994.

* cited by examiner

*Primary Examiner*—Daniel S. Larkin
(74) *Attorney, Agent, or Firm*—Adams & Wilks (57) ABSTRACT

A correlation sample of scanning probe microscope enable to detect correctly each force performing as a standard without influence of irregular data of surface of the sample. Photo-resist film is applied on surface of a silicon substrate, and the resist mask is patterned. Hollow portions having vertical wall face are formed at the silicon substrate by carrying out anisotropic etching using the resist mask for etching mask. After that, metal is deposited from upper side of resist mask by deposition method, the metal upper than the resist mask by lift off process is removed, and a correlation sample in which the metal is buried in the hollow portions of the silicon substrate is formed. Surface of the sample can be flattened by coating DLC film on surface of the correlation sample.

18 Claims, 12 Drawing Sheets

CORRELATION SAMPLE FOR SCANNING PROBE MICROSCOPE AND METHOD OF PROCESSING THE CORRELATION SAMPLE

BACKGROUND OF THE INVENTION

The present invention relates generally to a correlation sample for scanning probe microscope and to a method of processing the sample, and, more particularly, to a correlation sample for a scanning probe microscope for use as a measurement standard while measuring a state of a surface of a sample, and to a method of processing the correlation sample.

In recent years, am irregular shape of the surface of a sample can be observed at an atomic level. That is, in an atomic force microscope for resolving atomic structure, a cantilever having a tip at the head portion thereof is used as a scanning probe. When the tip is scanned across the surface of a sample serving as a measured surface, attraction or reaction based on atomic forces between the surface of the sample and the tip are generated, and the atomic forces can be measured by detecting deflection of the cantilever.

The scanning probe microscope includes a magnetic force microscope for detecting a magnetic force of a measured surface developed by application of the above-mentioned atomic force microscope (hereinafter, AFM), a scanning Maxwell stress microscope for detecting voltage and electrostatic force of the measured surface, and a Kelvin probe force microscope, and each can detect a force which can not be obtained from the irregular data of the measured surface. The magnetic force microscope (hereinafter, MFM), the scanning Maxwell stress microscope (hereinafter, SMM), and the scanning Kelvin force microscope (hereinafter, KFM) can obtain the irregular data of the measured data in high resolution similarly to the AFM, and irregular data and magnetic image data can be observed in the same domain and at the same time in the MFM for example.

Therefore, when comparing the conventional measuring and observing method, the above-mentioned MFM, SMM, and KFM have various advantages such as high resolution, capability of observation of shapes of any surface at the same time, and ease of data acquisition. Therefore, the application field of these microscopes is spreading in domain analysis of magnetic media, analysis of magnetic material, analysis of electric characteristics and failure analysis of semiconductors, and estimation of work function in material.

However, although a relative comparing image of each force (N pole and S pole in magnetic force for example) can be obtained in the conventional scanning type probe microscope because of object of observation, there has been a problem in obtaining absolute strength (magnetic strength for example) because of the lack of a measurement standard.

A recent AFM is capable of measuring absolutely and is not limited only to observation by preparing a correlation sample of standard height. However, there has been a problem in that measured value varies at replacement of microscopes and samples because the sample is one kind and the measured surface is measured with respect to the sample used as a standard. No correlation sample of force performing as a standard has been prepared for MFM, SMM, and KFM performing as scanning probe microscope except for the above-mentioned AFM. Accurate detection of force of a measured surface using these microscopes requires measurement in a state in which distance between the measured surface and the tip is always kept constant. However, it is difficult to detect force distribution of a real correlation sample because the influence of irregularity appears in a measurement result when the surface is irregular even if a correlation sample is made. For example, an object (a magnetic body and the like) generating a force (a magnetic force, for example) serving as a certain standard is located at a surface of a silicon or glass substrate so as to make a correlation sample and is used for the correlation sample performing as a measurement standard of high density magnetic media. However, a real force distribution of the sample can not be measured accurately because it is difficult to accurately keep the distance between the tip and the surface of sample constant if measurement is attempted while moving the tip up and down so that the distance is kept constant.

For compensation of the above problem, it has been considered that the result of force measurement of a sample surface may be corrected based on irregular data of a correlation sample previously obtained. However, force measurement by the cancellation system is not in practical use yet so as to obtain an accurate measurement value.

The present invention has been made in view of the above-mentioned inconvenience in the prior art. A first object of the present invention is to provide a scanning probe microscope in which each force performing as a standard is accurately detected without influence of irregular data of surface and strength value of each force at measurement can be determined (absolute measurement) correlating the microscope using the detection and a method of processing the correlation sample. A second object of the present invention is to provide a scanning probe microscope in which absolute measurement can be accurately carried out based on the irregular data and a method of processing the correlation sample.

SUMMARY OF THE INVENTION

To achieve the above-mentioned objects, the present invention in a first aspect includes a correlation sample of a scanning probe microscope for measuring the state of a surface of a sample, comprising foreign domain where material having physical constant differing from material of a substrate is buried with certain thickness toward in-plane direction of the substrate performing as a sample, wherein surface of said substrate is flat.

As foreign domain where material having physical constant differing from material of a substrate is buried with constant thickness toward in-plane direction of the substrate performing as a sample and surface of the substrate is flat, the present invention is not influenced by irregular data, and can purely and correctly detect each force performing as a standard so as to be possible to carry out absolute measurement in various kinds of scanning probe microscopes. Here, a material having a physical constant differing from the material of the substrate means, for example, a magnetic body generating magnetic strength performing as a standard in the case of MFM and material generating voltage and electrostatic force performing as a standard. These materials are buried in the substrate with a certain thickness in order to obtain enough thickness to detect force depending on the materials because the materials could not detect force enough if thickness of buried material is thin.

The present invention in a second aspect includes a method of processing a correlation sample of a scanning probe microscope for measuring a state of a surface of a sample comprising steps of, forming holes of certain depth having a vertical wall face in the surface of a substrate at a predetermined domain of the substrate performing as a sample, burying material having a physical constant differing from material of the substrate into the holes formed in the forming process, and flattening the surface of the domain where the material differing in physical constant from the substrate is buried and the surface of the substrate.

According to the present invention, holes of a certain depth having a vertical wall face in the surface of a substrate at a predetermined domain of the substrate are formed, a material having a physical constant differing from the material of the substrate is buried in the holes, and the surface of the domain where the substrate is buried and the surface of the substrate are flattened. Therefore, the present invention is not influenced by irregular data, and can purely and correctly detect each force to perform as a standard so as to be possible to carry out absolute measurement in various kinds of scanning probe microscopes.

The present invention in a third aspect includes a correlation sample of a scanning probe microscope for measuring the state of a surface of a sample, comprising at least one of domains having a plurality of different height standards and a plurality of different width standards formed toward in-plane direction of the substrate performing as a sample.

According to the present invention, there is no need to worry about changing a measurement value if a sample or device is changed because absolute measurement can be carried out based on the result of comparing different standards (height or width) formed on the same sample as at least one of domains of plural different height standards and plural different width standards. Thus, by forming plural height standards and width standards comprising irregular data on the same sample, correct absolute measurement can be carried out. Here, the domain performing as height standards and width standard means that accurate holes and projection portions in size are formed toward in-plane direction of the substrate and distance between these bottom face, upper face, and side face is used as a standard.

The present invention in a forth aspect includes a method of processing a correlation sample of a scanning probe microscope for measuring the state of a surface of a sample comprising steps of, forming at least one of domains of a first height standard and a first width standard at a predetermined position of a substrate serving as a sample, and forming at least one of domains of a second height standard and a second width standard at position of substrate differing from the domain formed in the forming process.

According to the present invention, at least one of domains of a first height standard and a first width standard at a predetermined position of a substrate, and at least one of domains of a second height standard and a second width standard is formed at another position of substrate differing from the domain. Thus, as plural standards are formed at another process, the standard formed at former process does not receive influence at later process so as to form plural standards correctly. The present invention in a fifth aspect includes a correlation sample of a scanning probe microscope for measuring the state of a surface of a sample, comprising, foreign domain where material having physical constant differing from material of a substrate is buried with a constant thickness toward the in-plane direction of the substrate performing as a sample, and at least one domain of height standard and width standard formed at a position of the substrate differing from said foreign domain.

According to the present invention, as foreign domain where material having physical constant differing from material of a substrate is buried with a certain thickness toward the in-plane direction of the substrate performing as a sample, and at least one domain of height standard and width standard formed at position of the substrate differing from the foreign domain, physical value performing as a standard with one sample and at least one of height standard and width standard are taken at the same time as a standard value.

The present invention in a sixth aspect includes a method of processing a correlation sample of a scanning probe microscope for measuring the state of a surface of a sample comprising steps of, forming holes of a constant depth having a vertical wall face in the surface of a substrate at predetermined domain of the substrate performing as a sample, forming at least one hole of height standard and width standard at position of the substrate differing from the hole formed at said forming process, burying selectively a material having a physical constant differing from material of the substrate into the holes having said vertical wall face, and flattening the surface of domain where material differing in said physical constant from the said substrate is buried and the surface of said substrate.

According to the present invention, holes of a certain depth having a vertical wall face are formed in a surface of a substrate at a predetermined domain of the substrate, at least one hole of height standard and width standard is formed at a position of the substrate differing from that at which the hole is formed, a material having a physical constant differing from the material of the substrate is buried into the holes having the vertical wall face, and the surface of domain where material differing in the physical constant is buried and the surface of the substrate. Therefore, it is possible to form a physical constant performing as a sample and at least one of a height standard and a width standard are formed on one sample so as to take at the same time as a standard value.

The present invention in the seventh aspect includes a correlation sample of a scanning probe microscope according to any of the first aspect and the fifth aspect, wherein a coating film having surface wear and abrasion resistance is formed on the surface of the formed correlation sample.

According to the present invention, as a coating film having surface wear and abrasion resistance is formed on the surface of the correlation sample, the surface of the sample is protected from difference of friction force caused by difference of material of the substrate and material of the foreign domain, oxidation, corrosion, charging of the surface of the sample, adhesion of contaminant by charging up, flaw of surface and asymmetric wear by probe so as to keep flatness.

The present invention in an eighth embodiment includes a method of processing a correlation sample of scanning probe microscope according to any of the second aspect and the sixth aspect, further comprising the step of forming a coating film having surface wear and abrasion resistance on the surface of the formed correlation sample.

According to the present invention, as a process of coating film having surface wear and abrasion resistance on the surface of the correlation sample is added in any of the second aspect and the sixth aspect, surface of the sample is protected from difference of friction force caused by difference of material of the substrate and material of the foreign domain, oxidation, corrosion, charging up of surface of the sample, adhesion of contaminant by charging up, flaw of surface and asymmetric wear by probe so as to keep flatness.

The invention of the ninth aspect include a correlation sample of scanning probe microscope comprising, an electric resistor formed in a substrate of a certain section among surface of the substrate performing as a sample, and electrodes connected with said electric resistor at said surface of the substrate for letting current flow to the electric resistor.

According to the present invention, as an electric resistor is formed with certain depth from surface of the substrate in a substrate of a certain section among surface of the substrate, and electrodes are connected with the electric resistor at surface of the substrate for letting current flow, quantity of calorie of the electric resistor can be controlled depending on quantity of current flowing through the electrodes. Therefore, a correlation sample enable to heat locally for observing interaction of heat and image can be obtained.

The invention includes a method of processing a correlation sample of scanning probe microscope comprising steps of, forming an electric resistor in a certain section by covering except the certain section of surface of the substrate including semiconductor with ion implantation mask and by implanting impurity ion into certain domain in the substrate, and forming electrode material on at least two connecting portions connected with said electric resistor on said surface of substrate. According to the present invention, as the electric resistor is formed in a certain section by covering except the certain section of surface of the substrate including semiconductor with ion implantation mask and by implanting impurity ion into certain domain in the substrate, and the electrical resistor and material of electrodes are connected with at least two contacting portions, quantity of calorie of the electric resistor can be controlled depending on quantity of current flowing through the electrodes from the electrodes. Therefore, a correlation sample enable to heat locally for observing interaction of heat and image can be obtained.

DETAILED DESCRIPTION OF THE PREFERRED EMBODIMENTS

Referring to the attached figures, embodiments of correlation samples for scanning probe microscopes and methods of processing the correlation samples according to the present invention will be described.

(First Embodiment)

FIGS. 1A to 1G are sectional views of a process showing a method of processing a correlation sample for detecting each force performing as a standard according to a first embodiment. The correlation sample of the first embodiment functions as a standard when magnetic force, electrostatic force, and voltage of surface are measured by MFM, KFM, SMM, and so on.

Figure 1A:
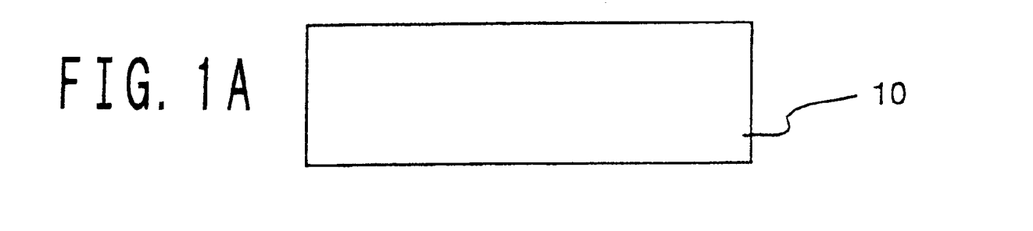
FIGS. 1A to 1G are sectional views of process showing a method of processing a correlation sample for detecting each force performing as a standard according to a first embodiment of the present invention.
Figure 1B:
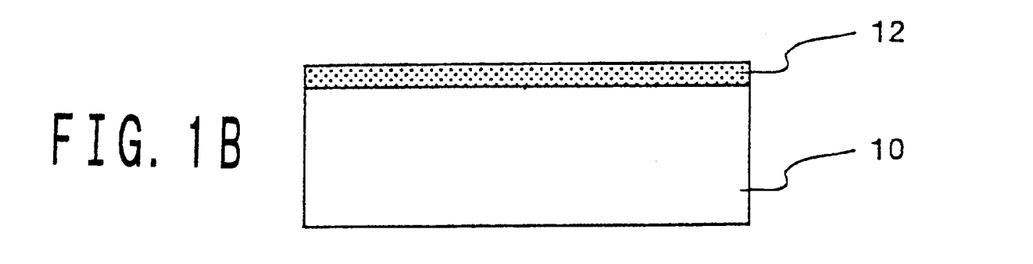
Figure 1C:
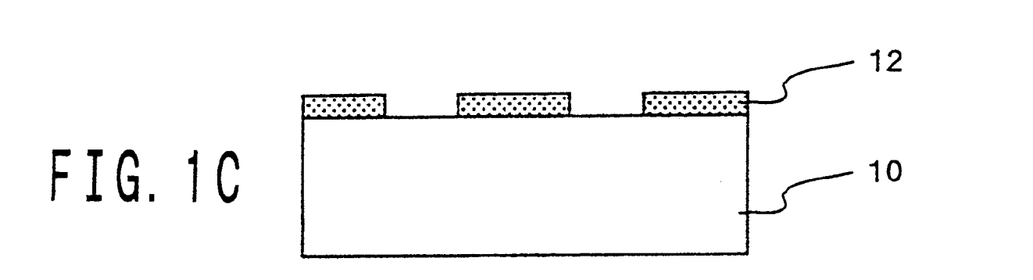

First, a photoresist film 12 of predetermined thickness is applied to surface of silicon substrate 10 shown in FIG. 1A and FIG. 1B, and the silicon substrate 10 is patterned so as to be covered by the photoresist 12 except at a part removed by etching using a photolithography process with photoresist film 12 (hereinafter resist mask) (FIG. 1C.)

Figure 1D:
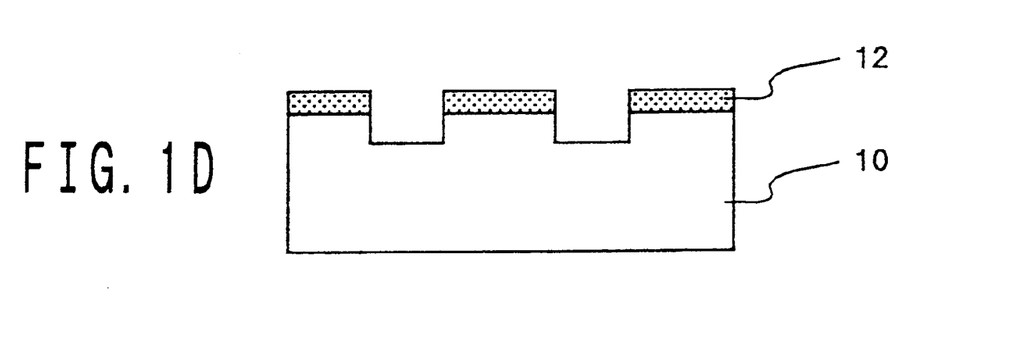

Next, anisotropic etching by reactive ion etching is carried out masking the resist mask 12 on the silicon substrate 10, so that the etching profile (side face) of the wall face of a hollow portion formed in the silicon substrate 10 is cut vertically as shown in FIG. 1D. Depth of the hollow portion can be controlled accurately by varying the etching time. Etching condition in this case is: use of $(SF_6+O_2)$ gas for etchant; gas pressure is 10 pa; and output is 100 W.

Figure 1E:
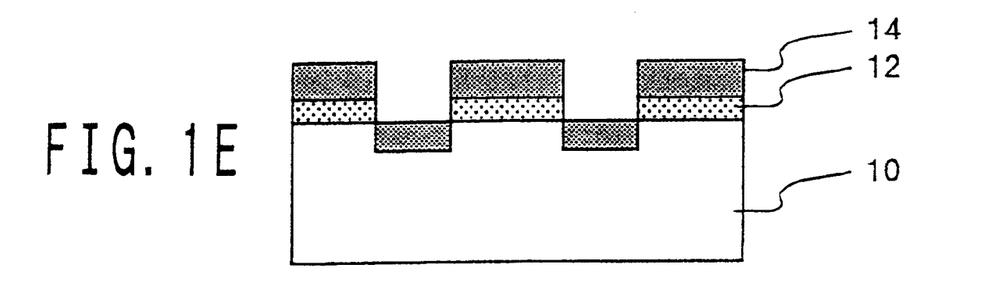

Next, a metal 14 is deposited by multi-parallel electronic beam deposition over the resist mask 12 as shown in FIG. 1E. Alloys such as (Fe—Ni) and (Pt—Co—Cr) except Co and Nb can be used for the metal 14. Of course, other materials can be used rather than these materials. Although the deposition is ohmic resistance heating deposition usually if the deposition process is used to deposit only a single metal such as the above-mentioned Co and Nb for example, deposition of alloy is possible if the deposition method is the multi-parallel electronic beam deposition adopted here.

In the case of detecting magnetic force by the MFM, it is impossible to detect magnetic force because thickness of the film is too thin only by coating whole (Fe—Ni) film with thickness of 20 nm for example. As the metal 14 is deposited thick and the sectional shape thereof is made rectangular as in FIG. 1E by forming a hollow portion using anisotropic etching as FIG. 1D in the first embodiment, it is possible to obtain sensibility enable to detect using effect of form magnetic anisotropy. By changing ratio of length to width (aspect ratio) and thickness of the metal 14, the strength can be changed.

Although sputtering is normally used for forming the above-mentioned multi metal film, a deposition process is adopted because sputtering wraps around the wall face and the like and a burr is easy to appear at the edge portion while removing extra metal film in the next process using a lift off method. As the deposition process has the characteristic that a film is not formed at a part of shadow seen from deposit source (shadow effect), the metal can be deposited only at the hollow portion of the silicon substrate 10 by using the shadow effect. Burr does not appear at the edge even after lift off of the next process. After that, by lift off process from state of FIG. 1E, metal 14 existing above the resist mask 12 can be removed, and a correlation sample is obtained in which the metal 14 is buried at the hollow portion of the silicon substrate 10 as shown in FIG. 1F.

Figure 1F:
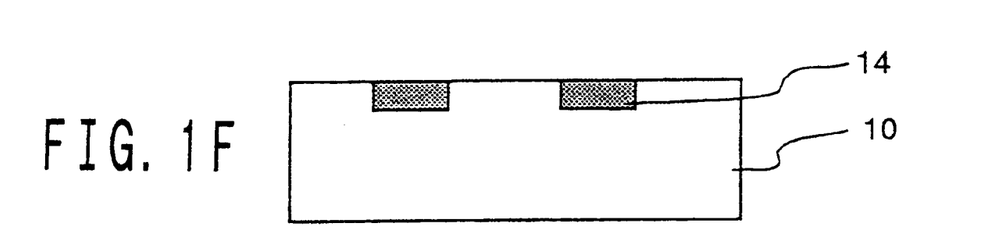
Figure 1G:
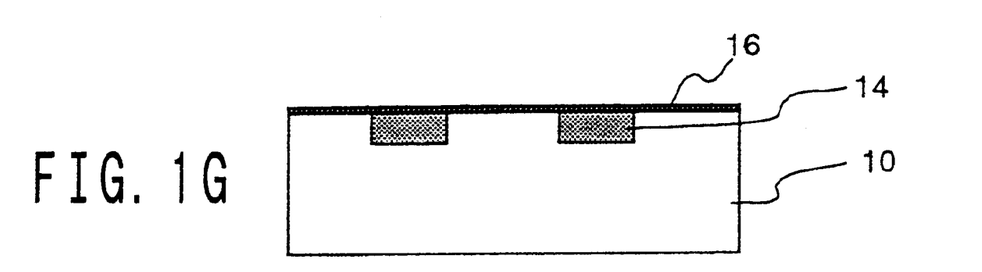

In the first embodiment, diamond like carbon (DLC) film 16 low in coefficient of friction, high in wear and abrasion resistance, and able to coat thin as the surface protecting film is surface-coated at thickness of about 5 to 10 nm using a CVD method as shown in FIG. 1F. The coat of DLC film 16 can make the surface of the correlation sample very smooth, and can form a sample not having an irregular surface. The coat has advantages in that it does not have any influence caused by a difference of frictional force and can protect the sample from oxidation, corrosion, charging up of sample surface, and adhesion of contaminant by the charging up.

In the first embodiment, although extra metal 14 deposited in FIG. 1F is removed by a lift off process, as another method rather than the above, a similar sample as that of FIG. 1F may be formed by removing extra metal 14 existing at the upper side of the silicon substrate 10 by chemical polishing and mechanical polishing after removing the resist mask 12 in FIG. 1D and by depositing the metal 14. In the case too, the DLC film 16 may be surface-coated.

Since above-mentioned, according to the first embodiment, a correlation sample performing as a standard for measuring magnetic force, electrostatic force, and voltage of surface of MFM, KFM, SMM, and so on and being smooth at surface thereof can be obtained. As various materials of single metal such as Co and Nb and alloys such as (Fe—Ni) and (Pt—Co—Cr) can be used for foreign material generating each force being buried in the substrate and shape of foreign material buried can be changed freely, the embodiment has an advantage to obtain easily sensibility and strength enable to detect. By surface-coating the DLC film and the like as surface protecting film of the correlation sample, the surface of the sample becomes very smooth even if the surface of the sample comprises foreign materials so as to remove influence caused by difference of frictional force. Moreover, the embodiment can protect the sample from oxidation, corrosion, charging up of sample surface, and adhesion of contaminant by the charging up.

(Second Embodiment)

Figure 2A:
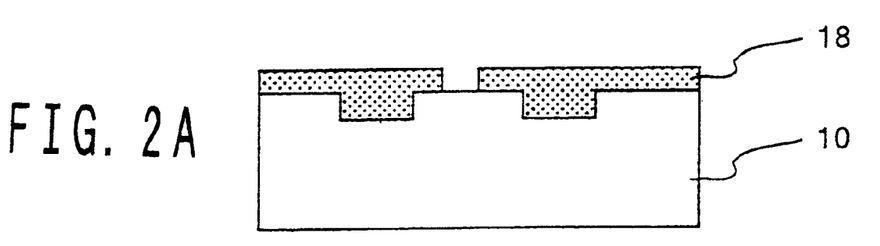
FIGS. 2A and 2B are sectional views of process showing a method of processing a correlation sample for detecting height and width performing as a standard according to a second embodiment of the present invention.
Figure 2B:
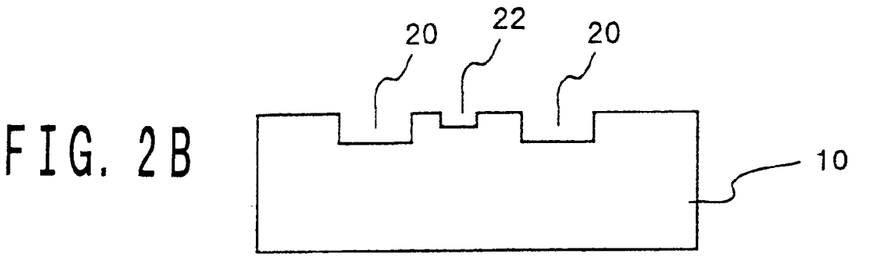

In FIGS. 2A and 2B, sectional views of processes describing a manufacturing method of a correlation sample to detect height and width performing as a standard according to the second embodiment are shown. The correlation sample of the second embodiment becomes a standard for measuring height and width by AFM. As manufacturing processes before FIG. 2A are the same as FIGS. 1A to 1D above-mentioned, additional figures and description thereof are omitted.

Namely, the hollow portion formed in the silicon substrate 10 of FIG. 1D is a sample performing as a first standard of height and width. After the resist mask 12 on the silicon substrate 10 shown in FIG. 1D is removed, photo-resist is applied again over the whole substrate, and a resist mask 18 covering the surface of substrate except a part is patterned by a photo lithography technique as shown in FIG. 2A.

By carrying out anisotropic etching by reactive ion etching using the resist mask 18 as an etching mask, a hollow portion 22 performing as a second standard of height and width is formed as shown in FIG. 2B. The etching profile (side face) of the wall side of the hollow portion 22 is etched vertically as similarly as the follow portions 20, and the depth of the hollow portion 22 can be controlled accurately by changing the etching time. The etching condition in this case is similar to that used in forming the hollow portions 20: using ($SF_6+O_2$) gas; gas pressure is 10 pa; and output of etching ion is 100 W. Changing only etching time, samples different in height are formed correctly on the same sample.

The hollow portions 20 and 22 provide samples different in width at the same time, and these widths can be determined freely by changing the size of the etching mask.

Thus, according to the second embodiment, a correlation sample having a standard for measuring height and width by AFM can be formed. As the correlation sample compares plural standards measuring the same sample with the same condition because of having height standard and width standard different from one sample, it is possible to carry out absolute measurement correctly based on the result of comparing so that difference in the result of measurement hardly appears even if sample and device differ from others.

(Third Edmbodiment)

Figure 3A:
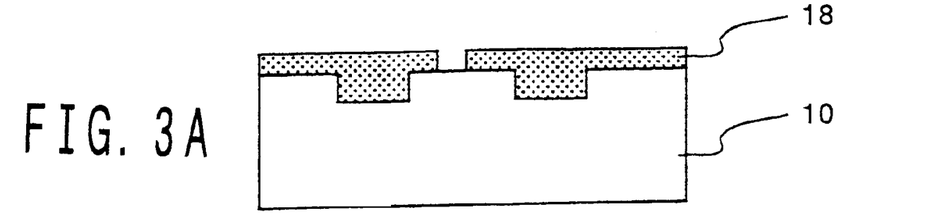
FIGS. 3A to 3F are sectional views of process showing a method of processing a correlation sample for detecting height and width performing as a standard probe according to a third embodiment of the present invention.

In FIGS. 3A to 3F, sectional views of processes describing a manufacturing method of a correlation sample used to detect height and width performing as a standard according to the third embodiment are shown. The correlation sample of the third embodiment becomes a standard for measuring height and width by MFM, KFM, SMM, and so on. As manufacturing processes before FIG. 3A are same as those shown in FIGS. 1A to 1D above-mentioned, additional figures and discussion thereof are omitted.

First, after the resist mask 12 on the silicon substrate 10 shown in FIG. 1D is removed once, photo-resist is applied again over the whole substrate, and a resist mask 18 is applied covering the surface of the substrate except a part patterned as shown in FIG. 3A.

Figure 3B:
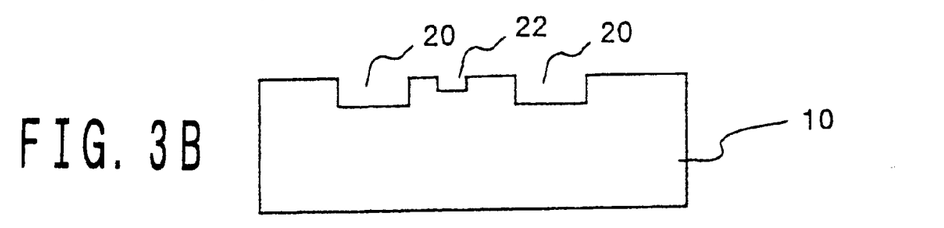

Then, by removing the resist mask 18 after anisotropic etching by reactive ion etching using the resist mask 18 as an etching mask, a hollow portion 20 for burying materials different in physical constant from the substrate and a hollow portion 22 performing as a standard of height are formed as shown in FIG. 3B. The etching profile (side face) of the side wall (face) of the hollow portions 20 and 22 are etched vertically, and the depth of the hollow portions can be controlled accurately by changing the etching time. The etching condition in this case is similar to that used in forming the hollow portions 20: using ($SF_6+O_2$) gas; gas pressure is 10 pa; and output of etching ion is 100 W.

Figure 3C:
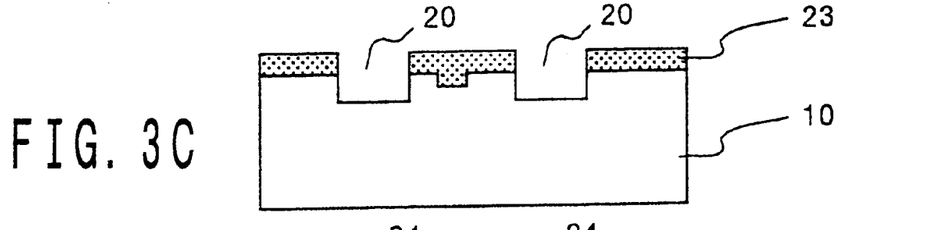

After applying photo-resist on the whole substrate, a resist film 23 for lift off process on surface of the silicon substrate 10 except the hollow portions 20 by photo lithography is patterned as shown in FIG. 3c.

Figure 3D:
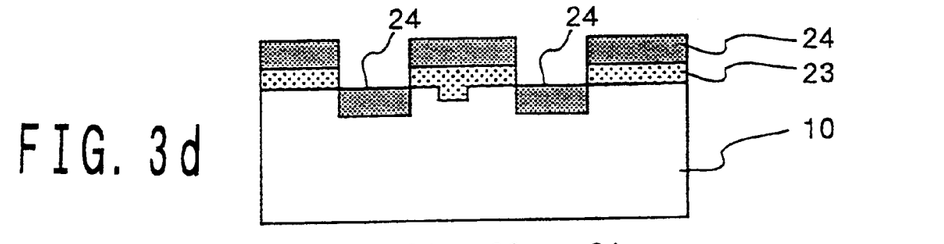

Metal 24 is deposited from upper side of the resist film 23 by parallel multi electron beam deposition as shown in FIG. 3D. For material of the metal 14 too, for example, Co, Nb, and alloy such as (Fe—Ni), (Pt—Co—Cr), and so on can be used. As above-mentioned, deposition process is adopted at burying material (metal 24) different from the hollow portions 20 in physical constant, therefore there is practically no wrapping around wall face and burr does not appear at the edge portion even when the metal upper than the resist film 23 using lift off process at the next process.

Figure 3E:
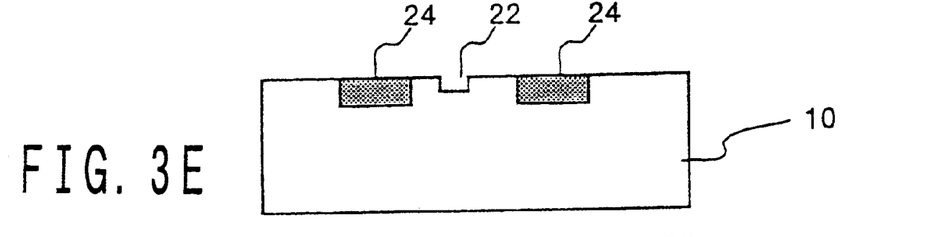

By melting the resist film 23 from the state of FIG. 3D and using lift off process removing the metal 24 upper than the resist film 23, the metal 24 is buried in the hollow portions 20 of the silicon substrate 10, and a correlation sample in which a hollow portion 22 performing as a standard of height is formed at the same time is formed.

Figure 3F:
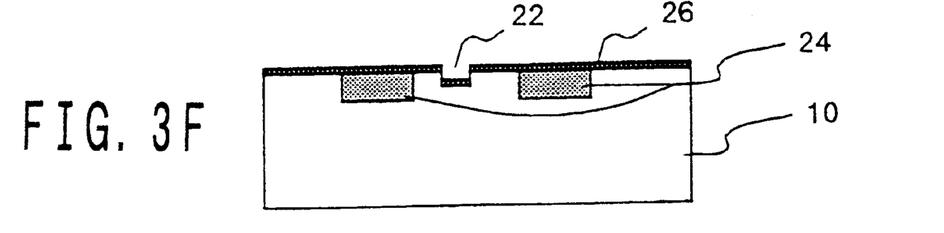

In the third embodiment, DLC film 26 for the surface protecting film thereof is surface-coated with thickness of about 5 to 10 nm by CVD method as shown in FIG. 3F. Therefore, the surface of the correlation sample can be made very smooth, does not have any influence caused by difference of frictional force, and can protect the sample from oxidation, corrosion, charging up of sample surface, and adhesion of contaminant by the charging up even if materials constituting surface such as the silicon substrate 10 and the metal 24.

In the third embodiment, extra metal 24 and the like may be removed using chemical polishing and mechanical polishing instead of the lift off process as similarly as the above-mentioned first embodiment.

Thus, according to the third embodiment, a complex sample having a correlation sample performing as a standard at measurement of magnetic force, electrostatic force, and voltage of surface of MFM, KFM, SMM, and so on and a correlation sample performing as a standard of height of AFM and the like. As various materials of single metal such as Co and Nb and alloys such as (Fe—Ni) and (Pt—Co—Cr) can be used for foreign material generating each force being buried in the substrate and shape of foreign material buried can be changed freely, the embodiment has advantage to obtain easily sensibility and strength enable to detect. By coating surface of the sample with the thin film such as DLC film low in coefficient of friction, the surface of the sample becomes very smooth so as to remove influence caused by difference of frictional force. Moreover, the embodiment can protect the sample from oxidation, corrosion, charging up of sample surface, and adhesion of contaminant by the charging up.

(Fourth Embodiment)

In FIG. 4A to FIG. 13, process charts describing a method of processing a correlation sample in which local heating for observing interaction of heat and image according to the fourth embodiment is possible are shown. Among them, FIGS. 4A to 4L show sectional views of process, and FIGS. 5 to 13 show plane views of main sectional views of process in FIGS. 4A to 4L. The correlation sample of the fourth embodiment can make local heating for observing interaction of heat and image possible at all measuring mode.

Figure 4A:
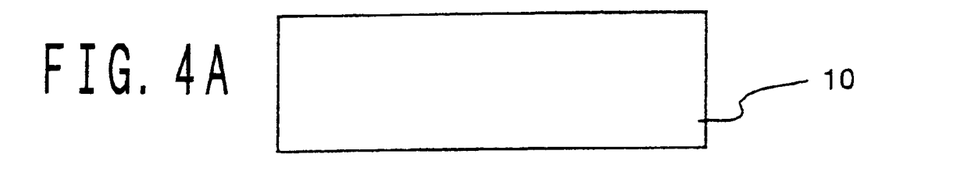
FIGS. 4A to 4L are sectional views of process showing a method of processing a correlation sample enable to heat locally for observing interaction between heat and image according to a fourth embodiment of the present invention.
Figure 4B:
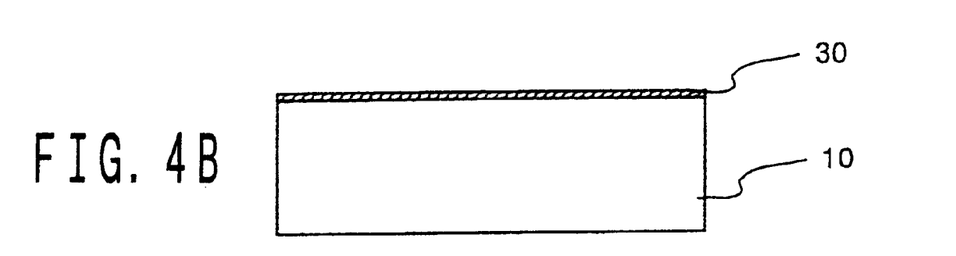

First, by thermal oxidation of surface of a silicon substrate (Si) shown in FIG. 4A, oxidation film ($SiO_2$) 30 having thickness of about several hundred angstrom is formed as FIG. 4B. The oxidation film 30 is formed in order to prevent surface of the silicon substrate 10 from becoming rough at ion implantation described later.

Figure 4C:
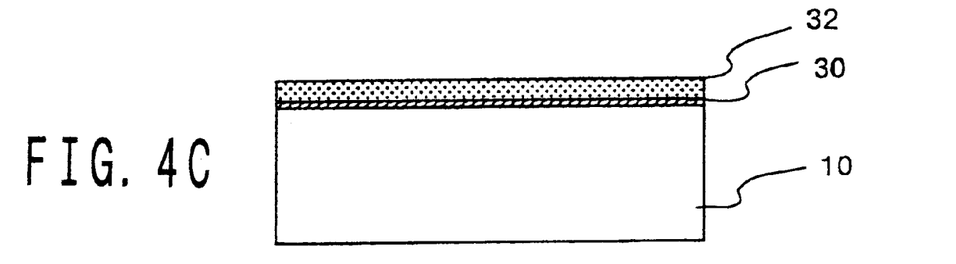
Figure 4D:
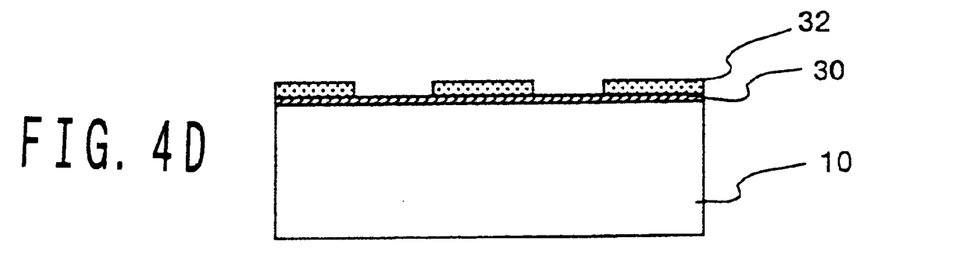
Figure 5:
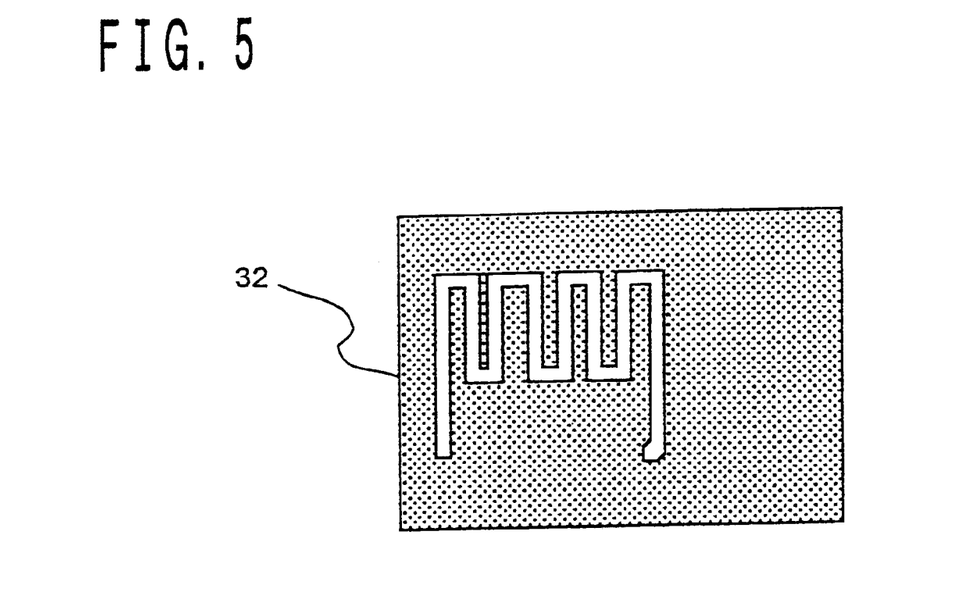
FIG. 5 is a plan view of FIG. 4D.

In FIG. 4C, a photo-resist film 32 is applied on the oxidation film ($SiO_2$) 30, and is patterned so that a part except a part forming resistor for heating in the silicon substrate 10 at process after photo lithography process is covered with the resist mask 32 (FIG. 4D.) Therefore, the resist mask 32 is an ion implantation mask. FIG. 5 is a plane view of patterning shape of the resist mask 32 in FIG. 4D seen from upper side, and a white part shows a part not covered with the resist mask 32.

Figure 4E:
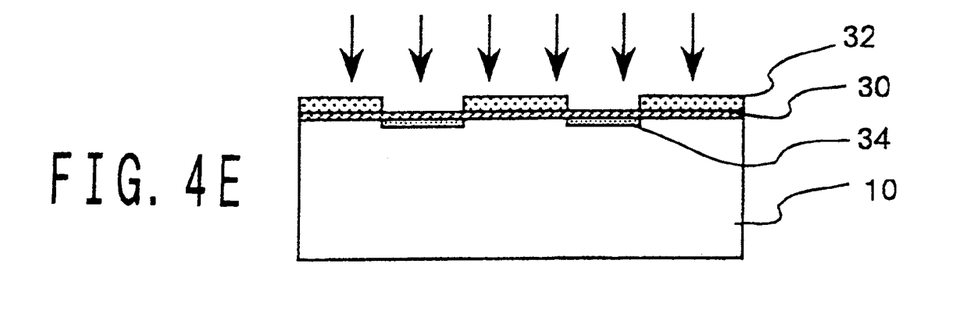
Figure 6:
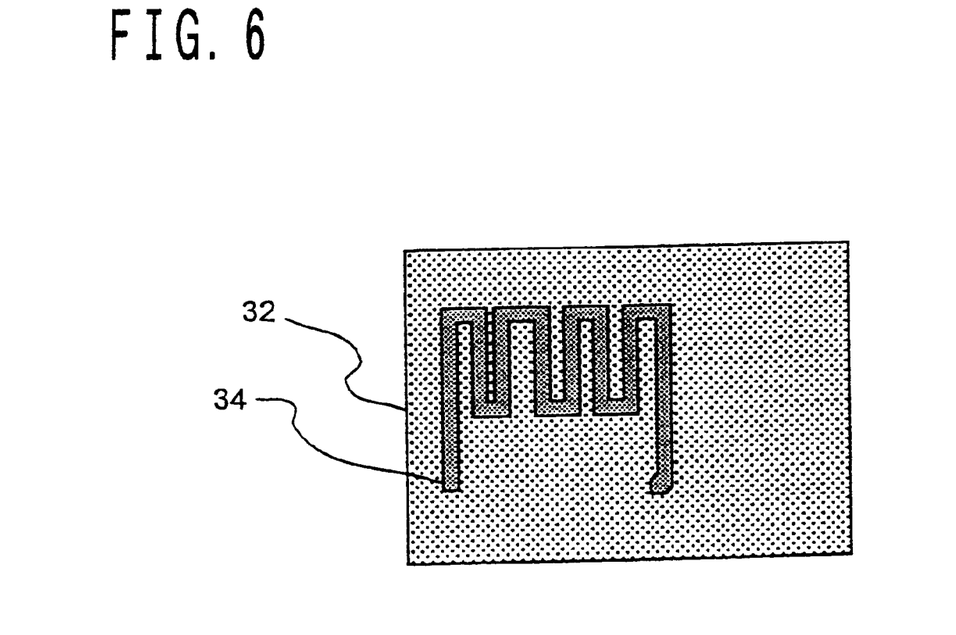
FIG. 6 is a plan view of FIG. 4E.

FIG. 4E shows a process carrying out ion implantation to the silicon substrate 10 using impurity ion such as boron (B), phosphorus (P), and so on. By adding little the above impurity into the silicon substrate performing as semiconductor, the ion implantation process is carried out in order to form domain having conductivity (here, resistor of heater portion.) Electric resistance of conductive domain formed in the substrate can be adjusted depending on ion concentration implanted. Although the ion implanted is B and the ion impurity is $15E15$ $atm/cm^2$ here, kinds and impurity of ion are not limited by these values. The B ion implanted to the substrate forms ion implantation portions 34 being collected near surface of the silicon substrate 10. The ion implantation portions 34 can become a resistor having a constant resistance by activation carrying out annealing. FIG. 6 is a plane view of shape of the ion implantation portion 34 in FIG. 4E seen from upper side.

Figure 4F:
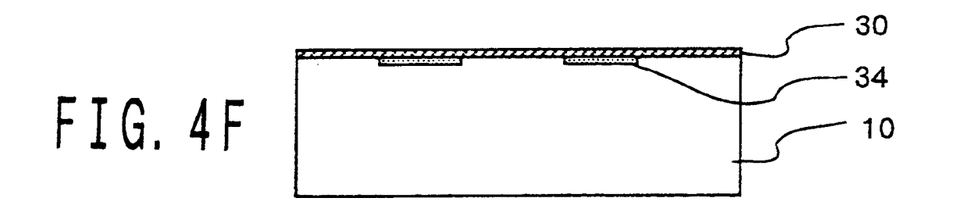
Figure 4G:
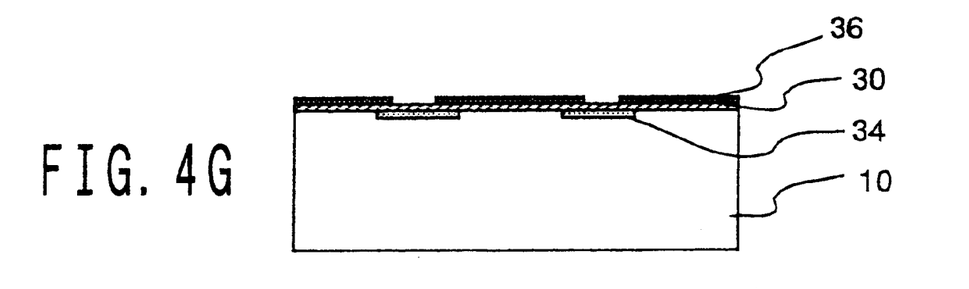
Figure 7:
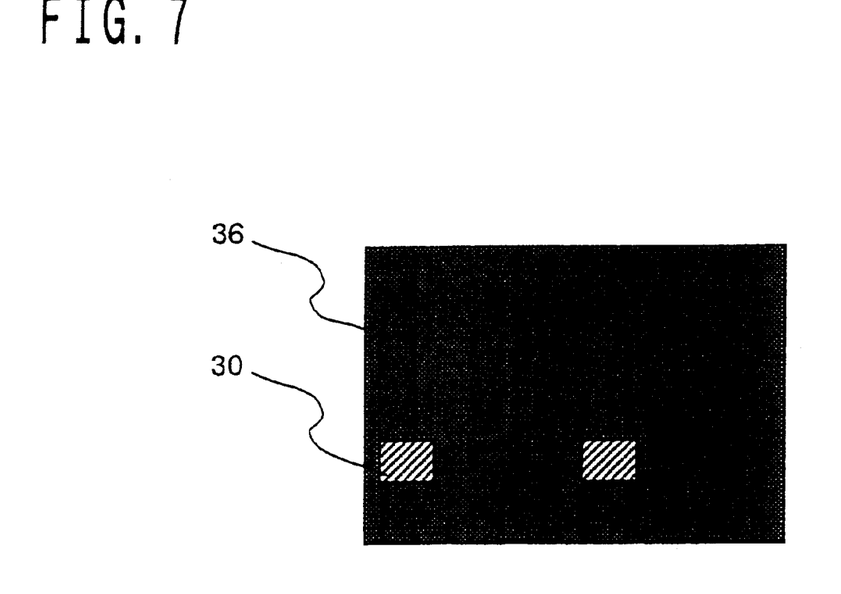
FIG. 7 is a plan view of FIG. 4G.

After the resist mask 32 is removed once as shown in FIG. 4F, photo-resist film 36 is applied on whole of the substrate and the substrate is patterned so that a portion except contacting portions forming electrodes for letting current flow through the resistor 34 by photo lithography process is covered the resist mask 36 (FIG. 4G.) FIG. 7 is a plane view of shape of the resist mask 36 in which the contacting portions are opened in FIG. 4G seen from upper side.

Figure 4H:
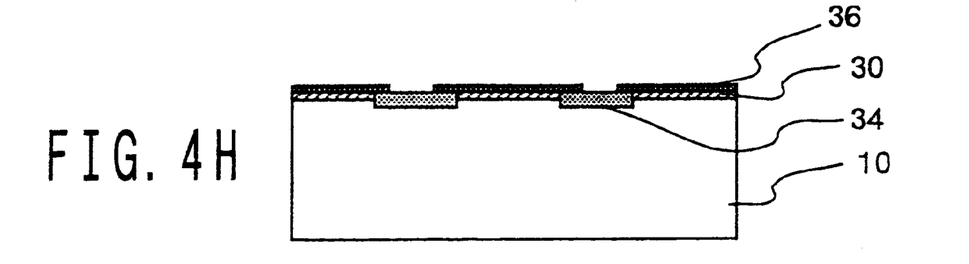
Figure 8:
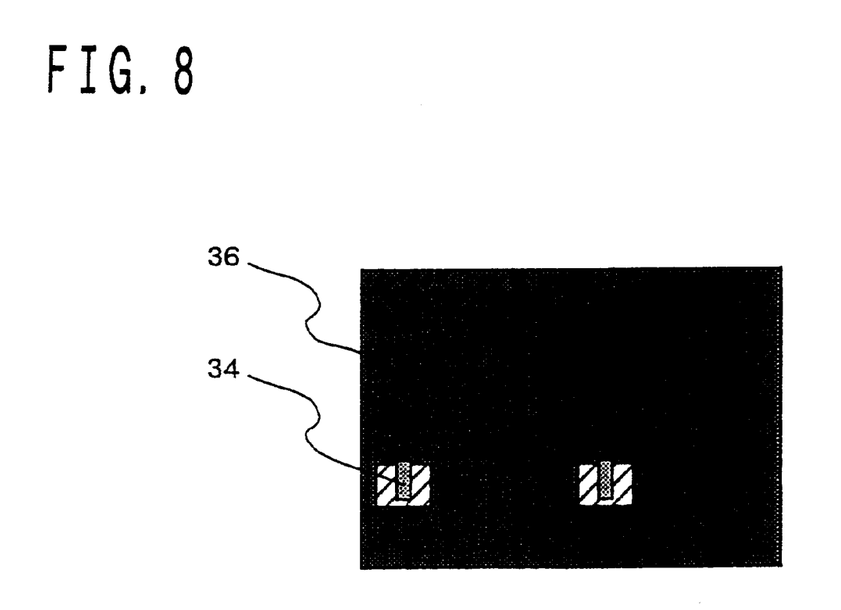
FIG. 8 is a plan view of FIG. 4H.
Figure 9:
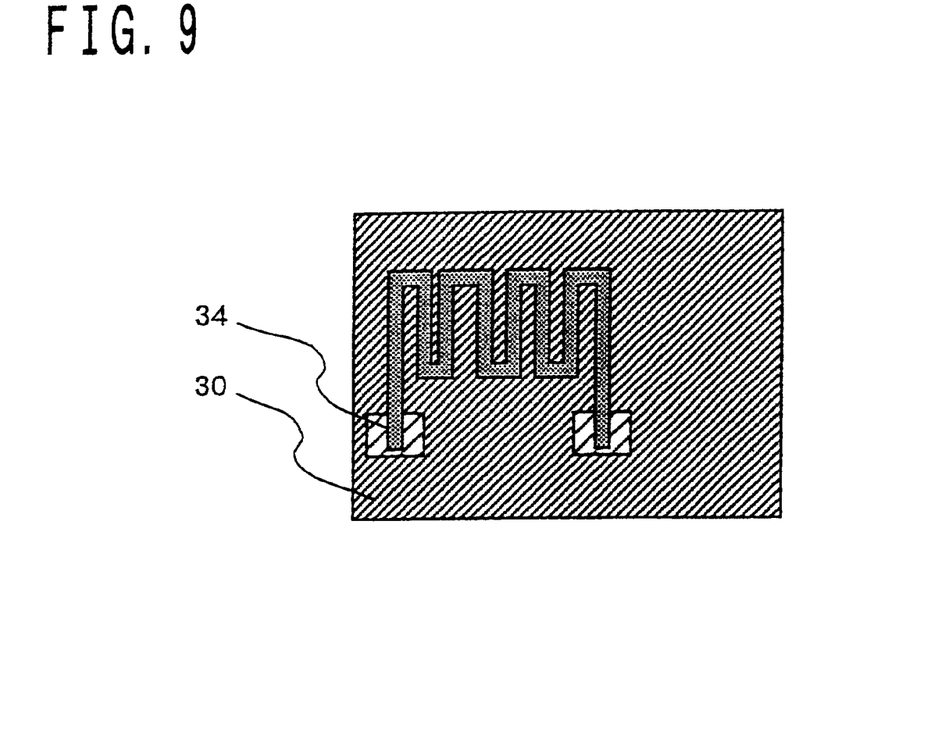
FIG. 9 is a plan view of FIG. 4I.

By etching the oxide film 30 with buffer hydrofluoric acid solution (BHF of 6:1) using the resist mask 36 as shown in FIG. 4H, only the oxide film 30 of the contacting portion is removed and a part of the ion implantation portions 34 can be exposed. FIG. 8 is a plane view showing the state in which the oxide film 30 of the contact portion is removed seeing from upper side in FIG. 4H.

Figure 4I:
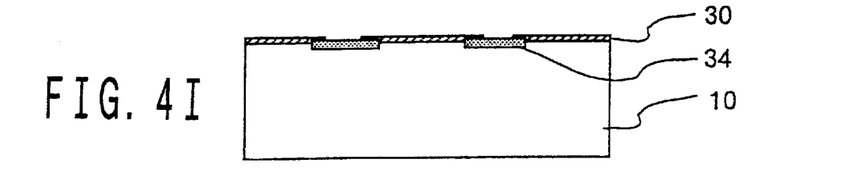
Figure 4J:
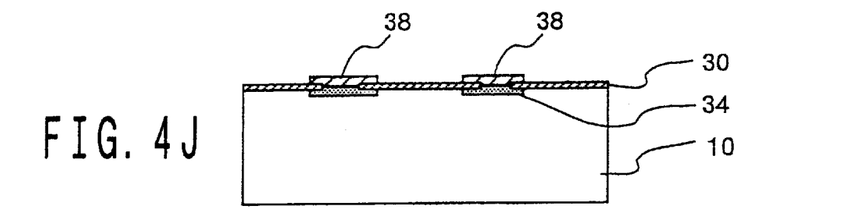

In FIG. 4I, the resist mask 36 is removed, and aluminum pads 38 for lead electrodes leading wires are patterned to exposed ion implantation portions 34 on the contact in FIG. 4J.

Figure 10:
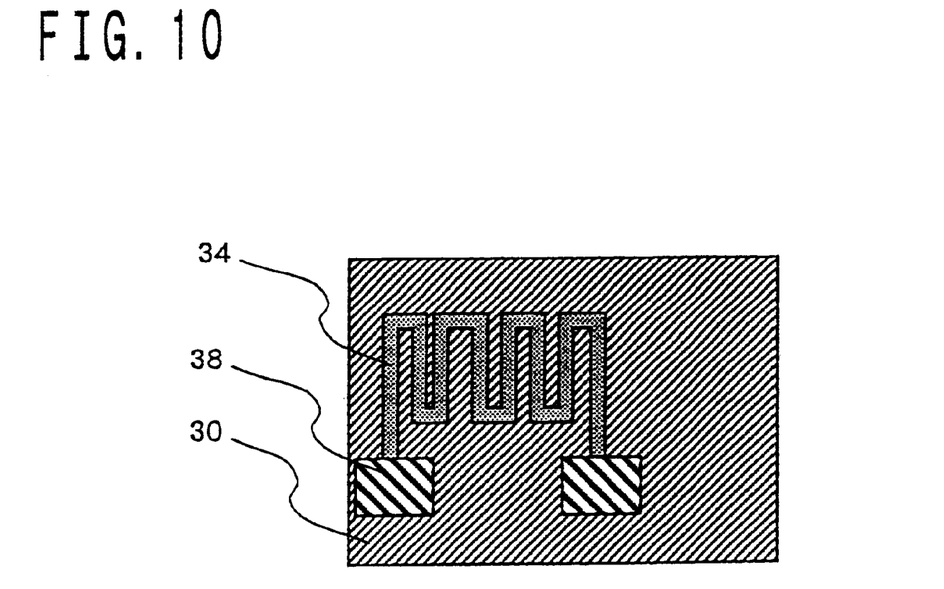
FIG. 10 is a plan view of FIG. 4J.

In the patterning process of the aluminum pads 38, aluminum film is formed with thickness of about 1 $\mu$m on the substrate, resist film is coated on it, and resist mask is patterned only at part in which aluminum is remained by photo lithography process. By etching aluminum using the resist mask for an etching mask and by removing the resist mask, the aluminum pads as shown in FIG. 4J can be formed. FIG. 10 is a plane view showing the state that the aluminum pads 38 are formed on the contacting portions seen from upper side in FIG. 4J.

Figure 4K:
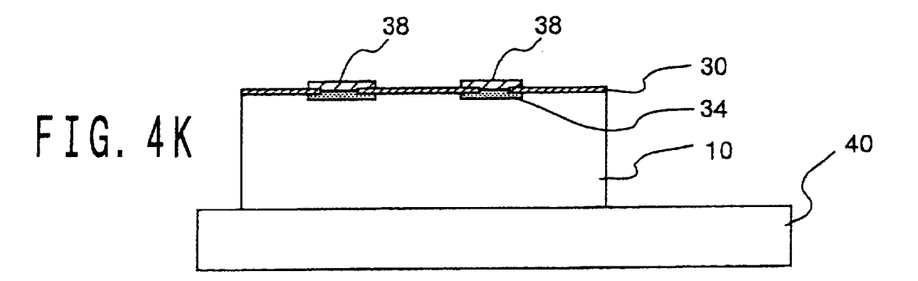
Figure 11:
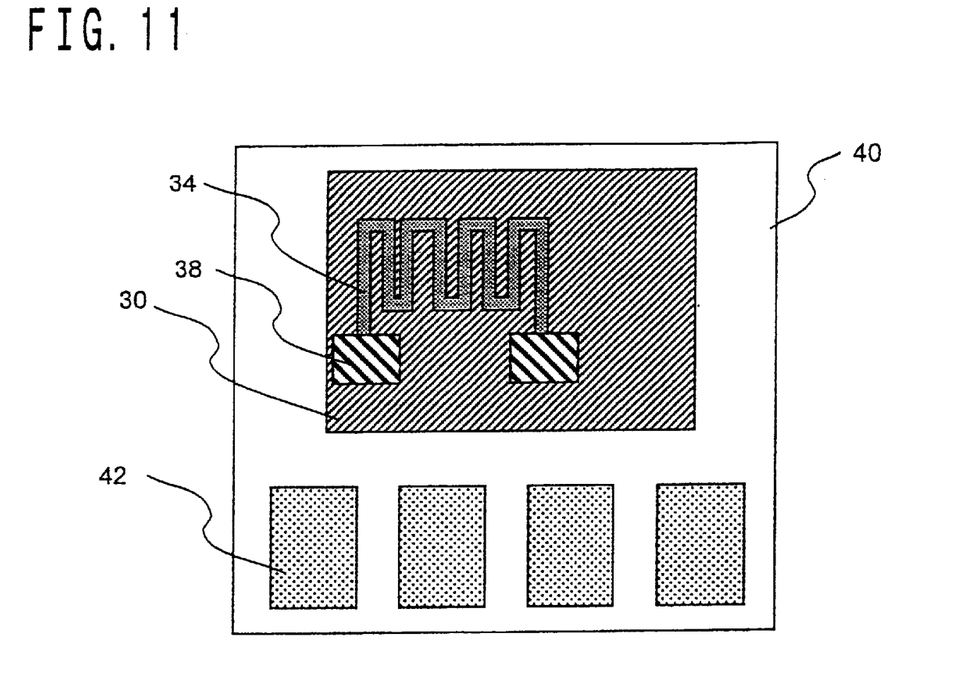
FIG. 11 is a plan view of FIG. 4K.

In FIG. 4K, a correlation sample formed in above-mentioned FIG. 4J and enable to heat locally is fixed on a board for bonding 40, and FIG. 11 shows a plane view of FIG. 4K. As shown in FIG. 11, electrodes 42 supplying current for heating to the correlation sample are located on the board for bonding.

Figure 4L:
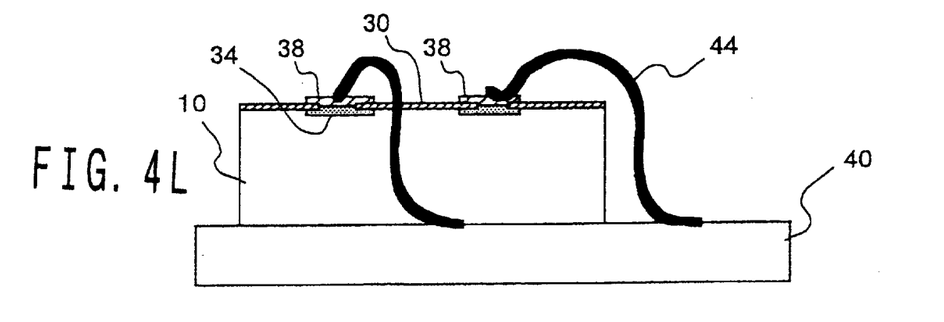
Figure 12:
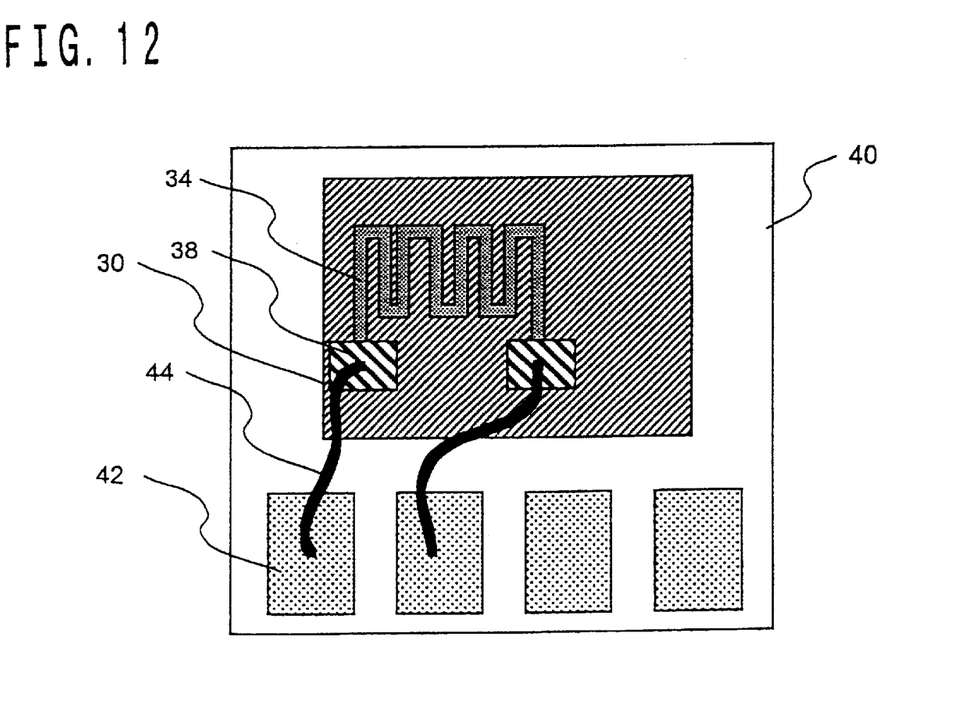
FIG. 12 is a plan view of FIG. 4L.

In FIG. 4L, the aluminum pads 38 of the correlation sample fixed on the board for bonding 40 in the above-mentioned FIG. 4K and electrode 42 (shown in FIG. 12) on the board for bonding 40 are connected by bonding with wires 44 such as gold wire. FIG. 12 shows a plane view of FIG. 4L.

Thus, the correlation sample shown in FIG. 12 can generate calorie depending on quantity of current by letting current supplied from electrodes 42 of the board for bonding 40 flow to resistor 34 in the silicon substrate 10 through the wires 44 and the aluminum pads 38.

Figure 13:
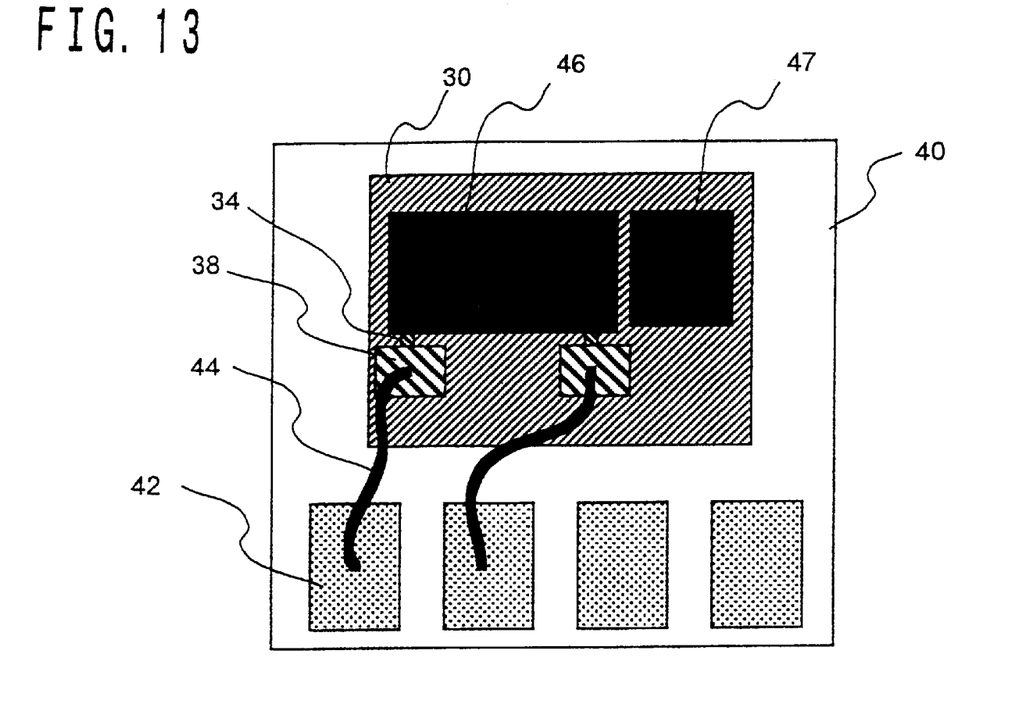
FIG. 13 is a plan view showing an example in which heat sink metal pad is formed at surface of the correlation sample of FIG. 12.

FIG. 13 shows an example in which a heat sink metal pad 46 is formed on the resistor 34 formed by implanting impurity ion into the silicon substrate. The heat sink metal pad 46 increases heat efficiency generated by the resistor 34. A heat sink metal pad 47 is formed at domain of light side of this paper where the resistor 34 is not formed too. The heat sink metal pad 47 is formed in order that heated state and un-heated state can be compared correctly by constituting heating domain and un-heating domain of surface of the correlation sample with the sane condition (material.)

As the above-mentioned heat sink metal pads 46 and 47 can be formed with the same thickness using the same aluminum film as the aluminum pads 38 described in FIG. 4J and FIG. 10, the pads can be made in parallel with process of the aluminum pads 38.

Thus, the fourth embodiment can make a correlation sample enable to heat the sample locally in order to observe interaction of heat and image. By adjusting quantity of current flowing to the resistor formed in the substrate, desired quantity of calorie can be controlled. Resistance of formed resistor can be changed so as to change quantity of calorie by changing impurity ion concentration implanted to the substrate at forming the resistor. Temperature rising of the correlation sample is possible at till several hundred ° C.

Although the above-mentioned fourth embodiment makes the correlation sample for observing heating state of the sample itself, for another use, the sample can be used for very compact heating holder by installing another sample on the correlation sample enable to heat locally.

According to the first and second aspects of the present invention, detecting each force performing as a standard can be carried out purely and correctly so as to carry out absolute measurement at various kinds of scanning probe microscope without influence of irregularity data of the sample.

According to the third and fourth aspects of the present invention, absolute measurement can be carried out further correctly as plural height standards and width standard comprising irregular data are formed on the same sample.

According to the fifth and sixth aspects of the present invention, physical constant and at least one of height standard and width standard performing as a standard are formed on one sample, and therefore these are taken at the same time.

According to the seventh and eighth aspects of the present invention, surface of the sample does not receive influence of difference of friction force and is protected from oxidation, corrosion, charging up of surface of the sample, adhesion of contaminant by charging up, flaw of surface and asymmetric wear by probe so as to keep flatness as coating film is formed on surface of the sample.

According to the ninth and tenth aspects of the present invention, a correlation sample enable to control quantity of calorie and enable to heat locally in order to observe interaction of heat and image is obtained.

What is claimed is:

1. A correlation sample for a scanning probe microscope for measuring a surface state of a sample, comprising: a substrate configured for placement on a sample stage of a scanning probe microscope and having a first surface; and a foreign domain comprising a material having different physical characteristics from the material of the substrate, the foreign domain being buried at a certain thickness beneath the first surface of the substrate and being exposed at the first surface; wherein the first surface of the substrate and the foreign domain form a substantially flat surface for scanning by a probe of the scanning probe microscope so that during use of the correlation sample displacement of the probe is not caused by variations in surface height of the correlation sample.

2. A method of fabricating a correlation sample for a scanning probe microscope according to claim 1; comprising the steps of forming one or more holes each having a certain depth in a predetermined region of the first surface of the substrate;

burying the foreign domain material into the holes formed in the forming process; and flattening the first surface of the substrate in the predetermined region where the foreign domain material is buried so that the first surface of the substrate and the buried material form a substantially flat surface.

3. A correlation sample for a scanning probe microscope according to claim 1; further comprising a plurality of regions of different height and width formed in the first surface of the substrate, each region having a vertical sidewall.

4. A method of fabricating a correlation sample for a scanning probe microscope according to claim 3; comprising the steps of forming one or more holes each having a certain depth in a predetermined region of the first surface of the substrate;

burying the foreign domain material into the holes formed in the forming process;

flattening the first surface of the substrate in the predetermined region where the foreign domain material is buried so that the first surface of the substrate and the buried material form a substantially flat surface;

forming one or more first regions of a first height and a first width at a predetermined position in the first surface of the substrate; and forming one or more second regions of a second height and a second width in the first surface of the substrate at a different position from the first regions.

5. A correlation sample for a scanning probe microscope according to claim 1; further comprising a plurality of regions each having a different height and width formed in the first surface of the substrate at a different position of the substrate from the foreign domain material.

6. A method of fabricating a correlation sample for a scanning probe microscope according to claim 5; comprising the steps of forming one or more first holes each having a certain depth and a vertical sidewall in a predetermined region of the first surface of the substrate;

forming at least one second hole having a different height and width from the first holes at a different position from the first holes in the first surface of the substrate;

burying selectively the foreign domain material into the first holes; and flattening the surface of the region of the substrate at which the foreign domain material is buried and the first surface of the substrate.

7. A correlation sample for a scanning probe microscope according to any one of claims 1 and 5; further comprising a coating film having surface wear and abrasion resistance formed on the first surface of the substrate and the foreign domain.

8. A method of fabricating a correlation sample for a scanning probe microscope according to any one of claims 2 and 6; further comprising the step of forming a coating film having surface wear and abrasion resistance on the first surface of the substrate and the material having physical characteristics differing from the substrate material.

9. A correlation sample for a scanning probe microscope according to claim 1; wherein the foreign domain material comprises one or more of (Fe—Ni), (PT—Co—Cr), Co and Nb.

10. A correlation sample for a scanning probe microscope according to claim 7; wherein the coating film comprises diamond like carbon (DLC).

11. A correlation sample for a scanning probe microscope according to claim 7; wherein a thickness of the coating film is in the range of about 5 to 10 nm.

12. A correlation sample for a scanning probe microscope, comprising: a substrate; a foreign domain material having different physical characteristics from that of the substrate buried within a first surface of the substrate so as to be exposed at the first surface, the first surface of the substrate and the exposed portion of the foreign domain material forming a substantially flat surface.

13. A correlation sample for a scanning probe microscope according to claim 12; wherein the foreign domain material comprises one or more of (Fe—Ni), (PT—Co—Cr), Co and Nb.

14. A correlation sample for a scanning probe microscope according to claim 12; further comprising a plurality of regions of different height and width formed in the first surface of the substrate, each region having a vertical sidewall.

15. A correlation sample for a scanning probe microscope according to claim 12; further comprising a plurality of regions each having a different height and width formed in the first surface of the substrate at a different position of the substrate from the foreign domain material.

16. A correlation sample for a scanning probe microscope according to claim 12; further comprising a coating film having surface wear and abrasion resistance formed on the first surface of the substrate and the foreign domain.

17. A correlation sample for a scanning probe microscope according to claim 16; wherein the coating film comprises diamond like carbon (DLC).

18. A correlation sample for a scanning probe microscope according to claim 16; wherein a thickness of the coating film is in the range of about 5 to 10 nm.

* * * * *